(12) United States Patent
Hanc et al.

(10) Patent No.: US 12,729,767 B1
(45) Date of Patent: Sep. 8, 2026

(54) ARMAMENT SYSTEM WITH A NON-ROTATING SLIP-FIT LABYRINTH SEAL

(71) Applicant: U.S. Government as Represented by the Secretary of the Army, Picatinny Arsenal, NJ (US)

(72) Inventors: Ryan Hanc, Mine Hill, NJ (US); Francis Sheer, McAdoo, PA (US); Christopher Kubik, Flanders, NJ (US); Arhum Mizra, Galloway, NJ (US); Edward Hyland, Waterford, NY (US); Joseph Kurowsky, Rensselear, NY (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 18/829,741

(22) Filed: Sep. 10, 2024

Related U.S. Application Data

(60) Provisional application No. 63/582,916, filed on Sep. 15, 2023.

(51) Int. Cl.
*F16J 15/44* (2006.01)
*F16J 15/02* (2006.01)
*F16J 15/447* (2006.01)
*F41A 3/76* (2006.01)

(52) U.S. Cl.
CPC .......... *F16J 15/447* (2013.01); *F16J 15/022* (2013.01); *F41A 3/76* (2013.01)

(58) Field of Classification Search
CPC .......... F16J 13/02; F16J 15/022; F16J 15/447; F16J 13/00; B67B 1/04; B01J 2219/1233; F41A 3/76
See application file for complete search history.

(56) References Cited

U.S. PATENT DOCUMENTS 2,746,632 A * 5/1956 Bramming ............ B65D 39/04 215/358
2,849,848 A * 9/1958 Ravn ........................ B67B 1/04 53/328
3,009,717 A 11/1961 Laser
3,332,572 A * 7/1967 Green .................... F16B 21/06 220/789
3,451,583 A * 6/1969 Leighton ............... F16L 55/132 220/233
3,744,805 A 7/1973 Heinrich
3,825,146 A * 7/1974 Hirmann ................. F16L 55/13 29/522.1
3,842,790 A * 10/1974 Clark ........................ B67B 7/02 215/296

(Continued)

FOREIGN PATENT DOCUMENTS

DE 3831523 A1 * 3/1990 ............ F16L 55/136
JP 2003261198 A * 9/2003 ............... B67B 1/04

*Primary Examiner* — Eugene G Byrd
(74) *Attorney, Agent, or Firm* — John P. DiScala

(57) ABSTRACT

A stub base seal comprises a non-rotating slip-fit labyrinth seal to provide additional sealing properties. The labyrinth seal serves to capture errant gasses in the event of a partial leakage between the stub base and a concentric surrounding surface and leverages eddy flow effects to induce back flow impingement thereby reducing the flow rate through a leaking cavity.

5 Claims, 8 Drawing Sheets

(56) References Cited

U.S. PATENT DOCUMENTS

| | | | | |
|---|---|---|---|---|
| 4,290,536 | A * | 9/1981 | Morel | B62D 25/24 220/795 |
| 4,363,420 | A * | 12/1982 | Andrews | B62D 25/24 29/458 |
| 4,583,654 | A * | 4/1986 | Pufpaff | B65D 39/04 220/DIG. 19 |
| 4,867,333 | A * | 9/1989 | Kolp, Jr | F28F 11/02 29/522.1 |
| 5,105,966 | A * | 4/1992 | Fort | F16J 13/00 220/327 |
| 5,779,085 | A * | 7/1998 | Havlinek | F16L 55/11 215/361 |
| 6,223,647 | B1 * | 5/2001 | Plantan | F16J 13/00 29/516 |
| 6,932,350 | B1 | 8/2005 | Husted | |
| 8,858,162 | B2 | 10/2014 | Manzoori | |
| 10,323,748 | B2 * | 6/2019 | Huebner | B62D 25/24 |
| 2002/0006330 | A1 | 1/2002 | Pross | |
| 2015/0211639 | A1 * | 7/2015 | Grimanis | F16J 15/164 277/303 |
| 2020/0207521 | A1 * | 7/2020 | Hu | F16J 13/02 |
| 2021/0126665 | A1 * | 4/2021 | Lee | F16J 15/067 |
| 2021/0341057 | A1 * | 11/2021 | Nguyen | F16J 15/062 |
| 2022/0106978 | A1 * | 4/2022 | Foucart-Gaudy | F16J 15/022 |

* cited by examiner

ARMAMENT SYSTEM WITH A NON-ROTATING SLIP-FIT LABYRINTH SEAL

CROSS-REFERENCE TO RELATED APPLICATIONS

This application claims priority under 35 USC § 119(e) to U.S. provisional patent application 63/582,916 filed on Sep. 15, 2023.

STATEMENT OF GOVERNMENT INTEREST

The inventions described herein may be manufactured, used and licensed by or for the United States Government.

FIELD OF THE INVENTION

The invention relates in general to seals and, in particular, seals for non-rotating components.

BACKGROUND OF THE INVENTION

Seals are employed in countless mechanical systems to prevent the flow of gas from one area to another and maintain pressure in the system. Obturators and gaskets are common examples. However, in certain systems, such as those which experience high pressure pulses and have components which require a slip fit, these common seals may be inadequate.

For example, in certain armament systems, stub bases may be used as an alternative to obturators. Stub bases serve as a seal to prevent gun gas leakage through the breech during the ballistic cycle while allowing for the chamber to be opened and cleared after forward venting of propellant gases. The stub base is positioned at the breech end of the gun tube. After firing the munition, as the pressure within the gun tube increases due to propellant gases, the stub base exterior diameter expands against the gun tube inner diameter thereby sealing the breech end of the gun tube.

In certain non-ideal scenarios, stub bases may experience leakage though the annulus formed between the stub outer diameter and the tube inner diameter. A need exists for a solution to arrest these errant leakage gasses prevent a full-length leakage that would otherwise reach the breech of the gun system.

SUMMARY OF INVENTION

One aspect of the invention is a non-rotating slip-fit stub base provides a primary seal against a static surface by expansion of the stub base against the static surface. The stub base comprises a cylindrical cup-shaped body, a flange and a secondary labyrinth seal. The cylindrical cup-shaped body has an open end and a closed end which define an interior cavity. The flange is positioned at the closed-end of the body. The body is configured to expand outward against the static surface in response to a pressure increase in the interior cavity. The secondary labyrinth seal is defined by an exterior circumferential surface of the stub base. The labyrinth seal comprises one or more grooves defined by an exterior surface of the body. The labyrinth seal extends radially around the exterior circumference of the body.

Another aspect of the invention is a non-rotating slip-fit stub base provides a primary seal against a gun barrel by expansion of the stub base against the gun barrel. The stub base comprises a cylindrical cup-shaped body, a flange and a secondary labyrinth seal. The stub base has an open end and a closed end which define an interior cavity. The flange is positioned at the closed-end of the body. The body is configured to expand outward against the gun barrel in response to initiation of a propellant. The secondary labyrinth seal is defined by an exterior circumferential surface of the stub base body. The labyrinth seal further comprises three grooves defined by the exterior circumferential surface of the stub base body. The grooves are spaced axially along the exterior circumferential surface and each extends radially around the exterior circumference of the stub base body. Each of the said three grooves extends into the body at a uniform angle toward the closed-end at a uniform width. The three grooves decrease in depth from the open end of the body to the closed end of the body.

A non-rotating slip fit seal provides a primary seal against a static surface by expansion of the slip fit seal against the static surface. The slip fit seal comprises a cylindrical cup-shaped body having an open end and a closed end defining an interior cavity. The body is configured to expand outward against the static surface in response to a pressure increase in the interior cavity. A secondary labyrinth seal is defined by an exterior circumferential surface of the slip fit seal. The labyrinth seal further comprises one or more grooves defined by an exterior surface of the body and extending radially around the exterior circumference of the body.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

A stub base comprises a non-rotating slip-fit labyrinth seal to provide additional scaling properties to the stub base. The labyrinth seal serves to capture errant gasses in the event of an partial leakage between the stub base and a concentric surrounding surface thereby preventing the partial leak from developing into a total leak. Advantageously the labyrinth seal accommodates extreme pressures, does not depend on initial interference and accommodates a positive clearance and seals a static (i.e. non-rotating) leakage cavity.

Under short duration pressure pulses, such as those experienced within an operating gun tube, the labyrinth seal provides secondary protection to the primary seal, the surface on surface interface. The labyrinth seal provides this additional protection by allowing the errant gasses to freely expand into grooves, stripping the flow of both momentum and mass, which may allow the sealing surfaces the necessary time to re-establish the primary seal. The labyrinth seal leverages eddy flow effects to induce back flow impingement thereby reducing the flow rate through a leaking cavity.

The labyrinth seal may be employed in any system in which a non-rotating static seal is employed to seal a cavity. While the labyrinth seal is described within in the context of a stub base for use in an armament system, the labyrinth seal is not limited to this embodiment. For example, the labyrinth seal may be employed to seal a cavity within a rocket system.

Figure 1:
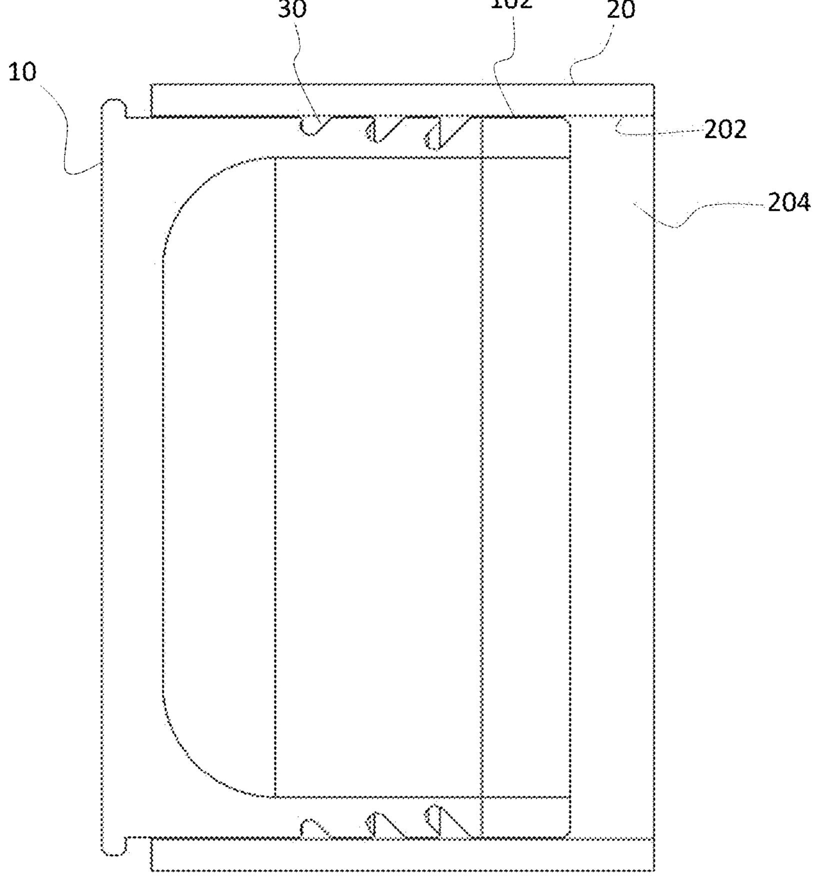
FIG. 1 is a cross-sectional view of a stub base seal within a cavity, according to an embodiment.

FIG. 1 is a cross-sectional view of a stub base within a cavity, according to an embodiment. The stub base 10, also referred to as a non-rotating slip fit seal, is positioned within the cavity of a concentric cylinder 20, such as a barrel 20, to seal the barrel cavity 204 from leakage. The stub base 10 is configured to be inserted into a barrel 20 such that it is axially aligned with the barrel 20.

The exterior circumferential surface 102 of the stub base 10 is opposed to an interior surface 202 of the barrel 20. The stub base 10 and the barrel 20 may have a slip fit tolerance to allow insertion of the stub base 10 into the barrel cavity 204. Both exterior surface 102 of the stub base 10 and the interior surface 202 of the barrel 20 are static, non-rotating surfaces.

Figure 2:
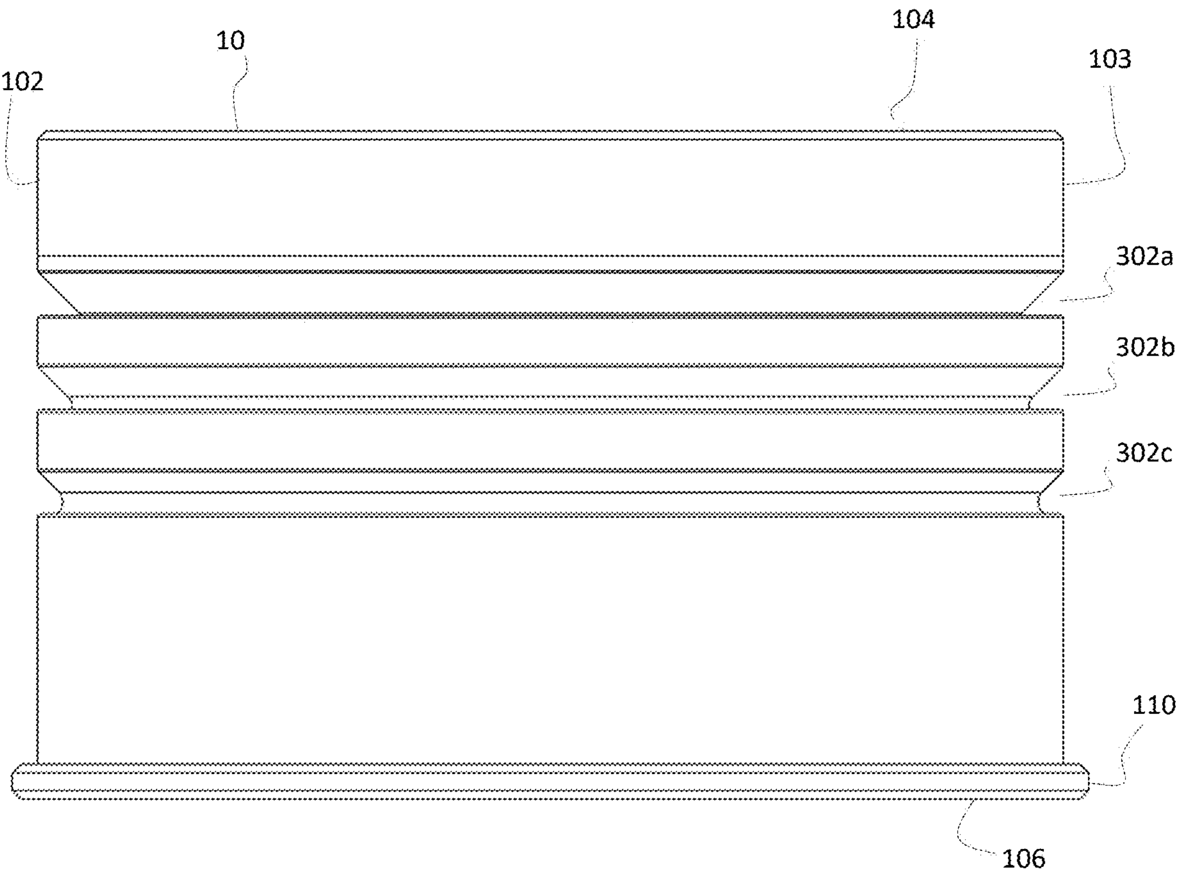
FIG. 2 is a side view of a stub base with a labyrinth seal, according to an embodiment.
Figure 3:
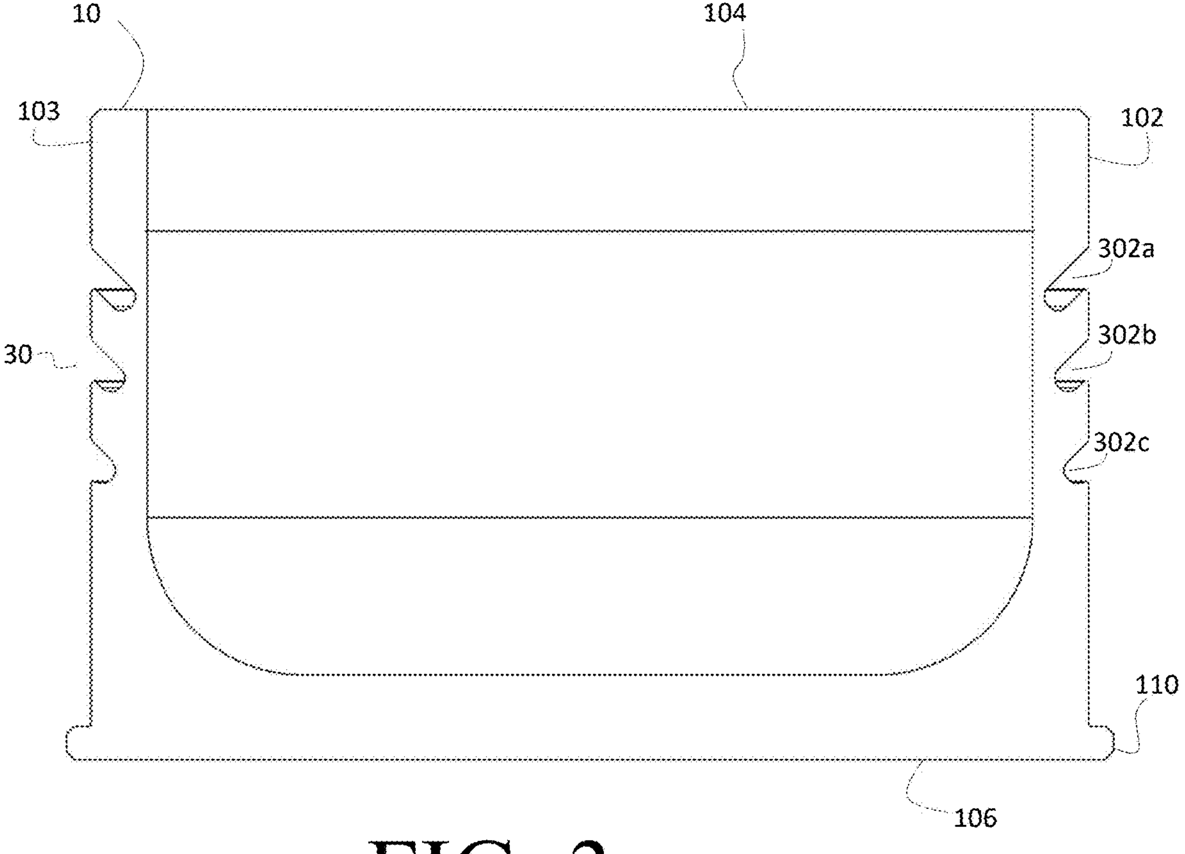
FIG. 3 is a cross-sectional view of a stub base with a labyrinth seal, according to an embodiment.
Figure 4:
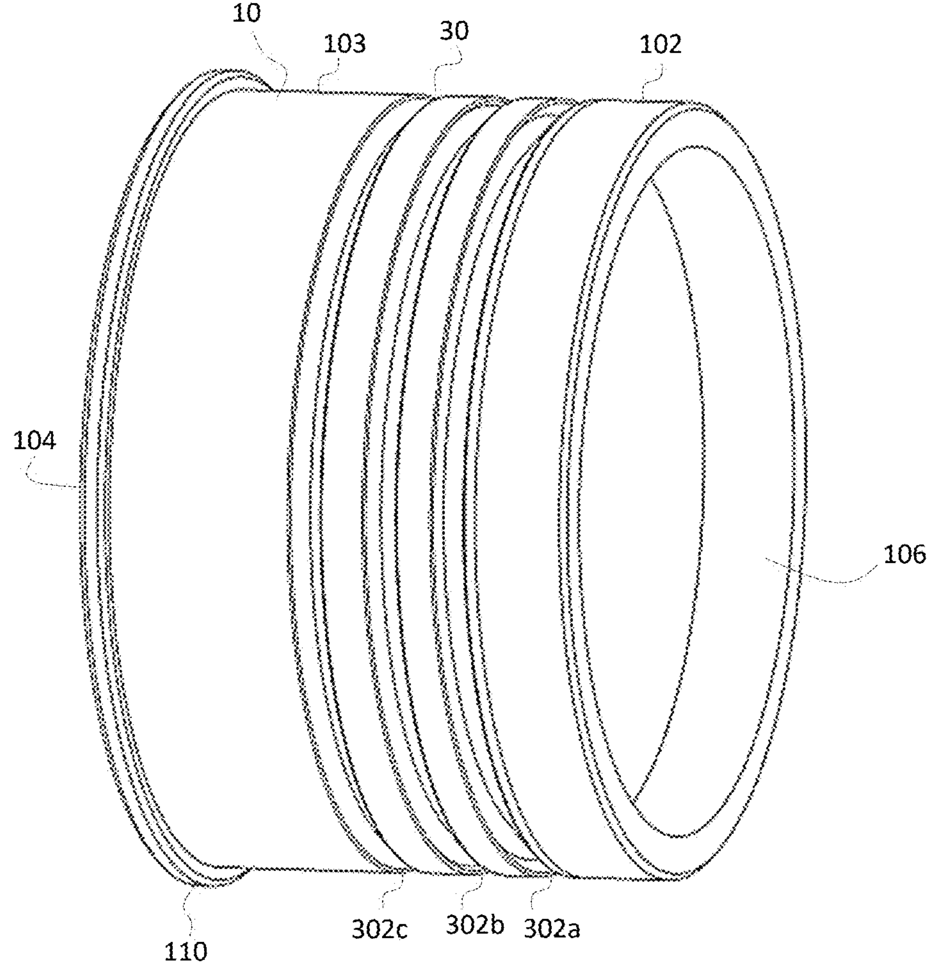
FIG. 4 is an isometric view of a stub base with a labyrinth seal, according to an embodiment.

The stub base's 10 primary means of sealing is an interface formed by the expansion of the cylindrical exterior surface 102 of the stub base 10 against the concentric cylindrical interior surface 202 of the barrel cavity 204. The labyrinth seal 30 serves as a secondary means of sealing by capturing errant gasses in the event of a partial leakage between the exterior surface 102 of the stub base 10 and interior surface 202 of the barrel 20. The labyrinth seal 30 leverages eddy flow effects to induce back flow impingement thereby reducing the flow rate through a leaking orifice. The operation of the labyrinth seal 30 allows the primary seal to reestablish after initial leakage. By allowing for the primary seal to reestablish, the labyrinth seal 30 prevents a partial leak from developing into a total leak in which gases are allowed to escape the barrel cavity 204 and pressure is lost FIG. 2 is a side view of a stub base with a labyrinth seal, according to an embodiment. FIG. 3 is a cross-sectional side view of a stub base with a labyrinth seal, according to an embodiment. FIG. 4 is an isometric view of a stub base with a labyrinth seal, according to an embodiment.

The stub base 10 body 103 is a hollow cylindrical cup of uniform diameter with a closed end 104, also referred to as the base, and an open end 106, also referred to as the top. A flange 110 is positioned at the base of the stub base 10. The flange 110 has a diameter greater than the diameter of the body 103 of the stub base 10 to prevent insertion of the stub base 10 into the barrel cavity 204 beyond the desired depth.

The stub base 10 comprises a labyrinth seal 30 defined by an exterior circumferential surface 102 of the stub base 10. The labyrinth seal 30 further comprises three circumferential grooves 302*a,c* defined by the exterior surface 102 of the stub base 10 and extending around the circumference of the stub base 10. The groove width 304, or axial length of the groove 302, is relatively thin compared to the overall height, or axial length, of the stub base 10. In the embodiment shown, the grooves 302 *a,c* are spaced approximately equidistant from each other and generally centered about the midpoint of the stub base 10. The three grooves 302*a,c* are located within the middle third of the stub base 10 with approximately equal distance to the top 104 of the stub base 10 and the base 106 of the stub base 10.

While the embodiment shown comprises a labyrinth seal 30 comprising three grooves 302*a,c*, the labyrinth seal 30 is not limited to three grooves 302 and may comprise more than three grooves 302 or less than three grooves 302. Further, while the embodiment shown comprises three distinct circumferential grooves 302, the labyrinth seal 30 is not limited to distinct circumferential grooves 302. In an alternative embodiment, the labyrinth seal 30 comprises a helical groove 302 extending around the exterior circumferential surface 102 and axially up and down the exterior surface 102.

Figure 5:
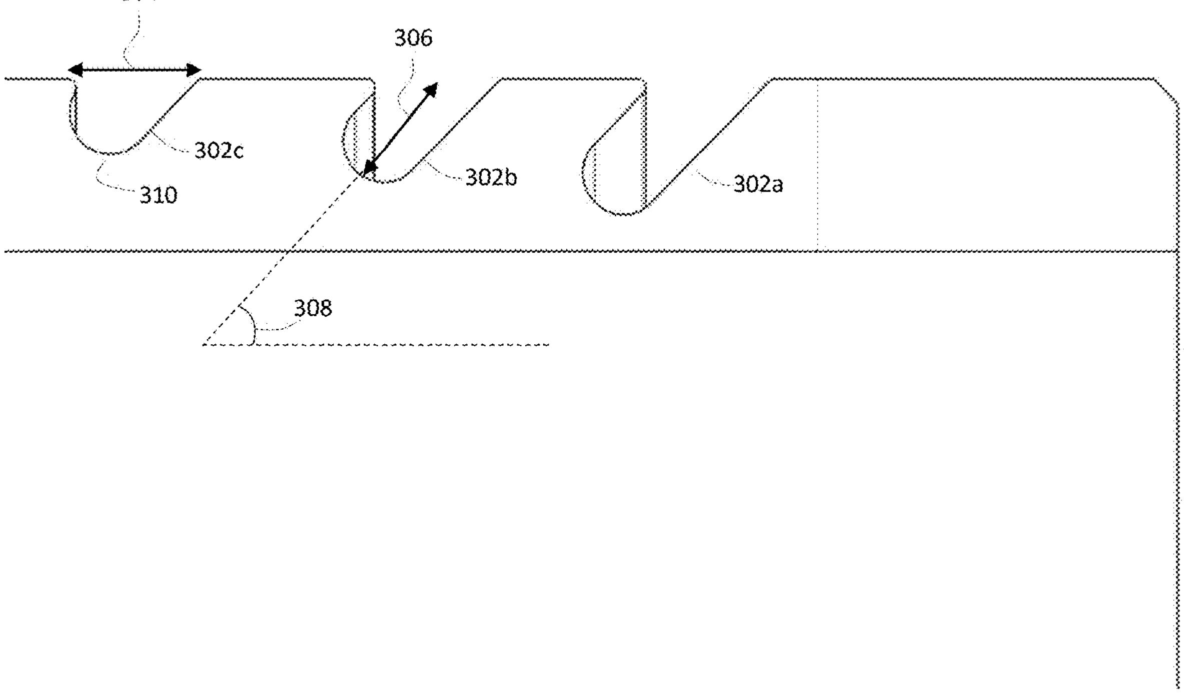
FIG. 5 is a magnified view of a labyrinth seal, according to an embodiment.

FIG. 5 is a magnified view of a labyrinth seal, according to an embodiment. Each of the grooves 302*a,c* extends into the stub base 10 at an angle toward the base 106 of the stub base 10. Each groove 302 comprises a width 304, a depth 306 and a groove angle 308. In the embodiment shown, each of the grooves 302 has a generally uniform width 304 through the depth 306 of the groove 302 with each groove culminating in a curved terminus 310.

In the embodiment shown, the grooves 302 increase in depth 306 away from the base 106 such that the groove 302*c* closest to the base 106 is the shallowest and the groove 302*a* furthest from the base 106 is the deepest. However, the depth 306 of the grooves 302 may be uniform or vary differently from the embodiment shown, depending on structural requirements of the application.

The geometry of the grooves 302, including but not limited to groove width 304, groove depth 306, groove angle 308, and cross-sectional profile, is selected depending on the application of the stub base 10 to provide both the largest volume possible to accept gases and to enable leveraging of flow-redirection efforts to provide back-pressure that effectively slows the gas flow through the leakage annulus. For example, the speed of the gas to enter into the groove is accounted for and the geometry of the groove 302 is selected such that the gas stagnates in the groove 302 rather than passes over the groove 302.

Figure 6:
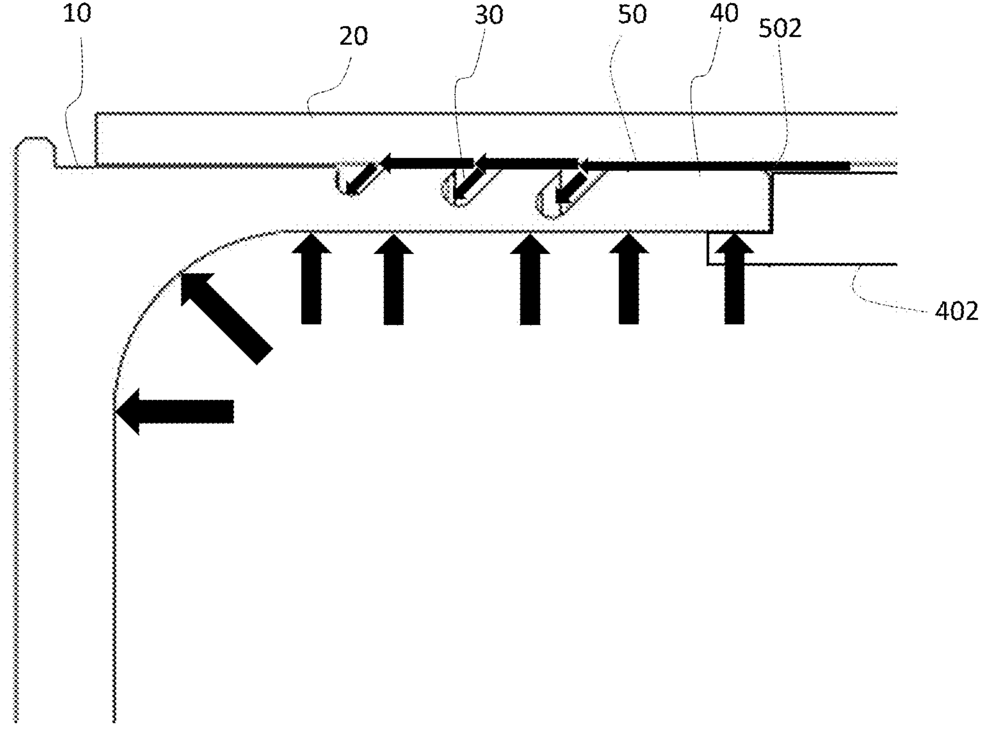
FIG. 6 is a cross-sectional view of a stub base with a labyrinth seal inserted within a barrel, according to an embodiment.

FIG. 6 is a cross-sectional view of a stub base with a labyrinth seal inserted within a gun barrel, according to an embodiment. In an embodiment, the stub base 10 is employed to seal the breech end of a gun tube 20. In this embodiment, the stub base 10 serves as the base of an ammunition cartridge 40 with the stub base 10 supporting the cartridge case body 402 and housing the primer and a portion of the propellant. Upon ignition of the primer/propellant, internal pressure expands the stub base 10 radially outward such that the stub base 10 is in contact with the gun tube 20 thereby forming the primary seal 50. Should high pressure and multi-variable influences initiate a leak at the primary seal edge 502, the labyrinth seal 30 prevents a "full leak event" by prohibiting rapid propagation of the leak to the end of the seal. As illustrated in FIG. 6, the grooves 302 provide successive pockets which allow the errant gasses to freely expand into grooves 302, stripping the flow of both momentum and mass, which may allow the sealing surfaces the necessary time to re-establish the primary seal 50. The labyrinth seal 30 leverages eddy flow effects to induce back flow impingement thereby reducing the flow rate through a leaking cavity.

Figure 7:
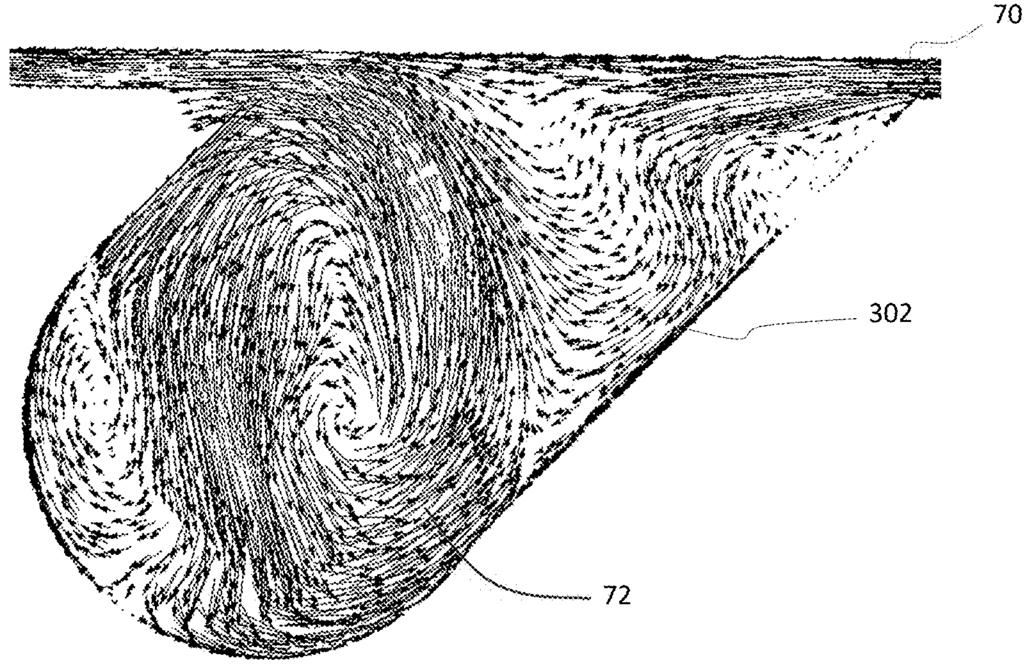
FIG. 7 is a magnified view of a groove of a labyrinth seal illustrating gas flow within the groove, according to an embodiment.

FIG. 7 is a magnified view of a groove of a labyrinth seal illustrating gas flow within the groove, according to an embodiment. Eddy formation in the labyrinth seal 30 results in backflow which impinges on the leakage flow 70. The geometry of the groove 302 promotes eddy formation 72 within the groove 302 which impinges the errant flow 70. As errant gases enter the groove, the groove induces an eddy flow 72 back toward the errant flow 70.

Figure 8:
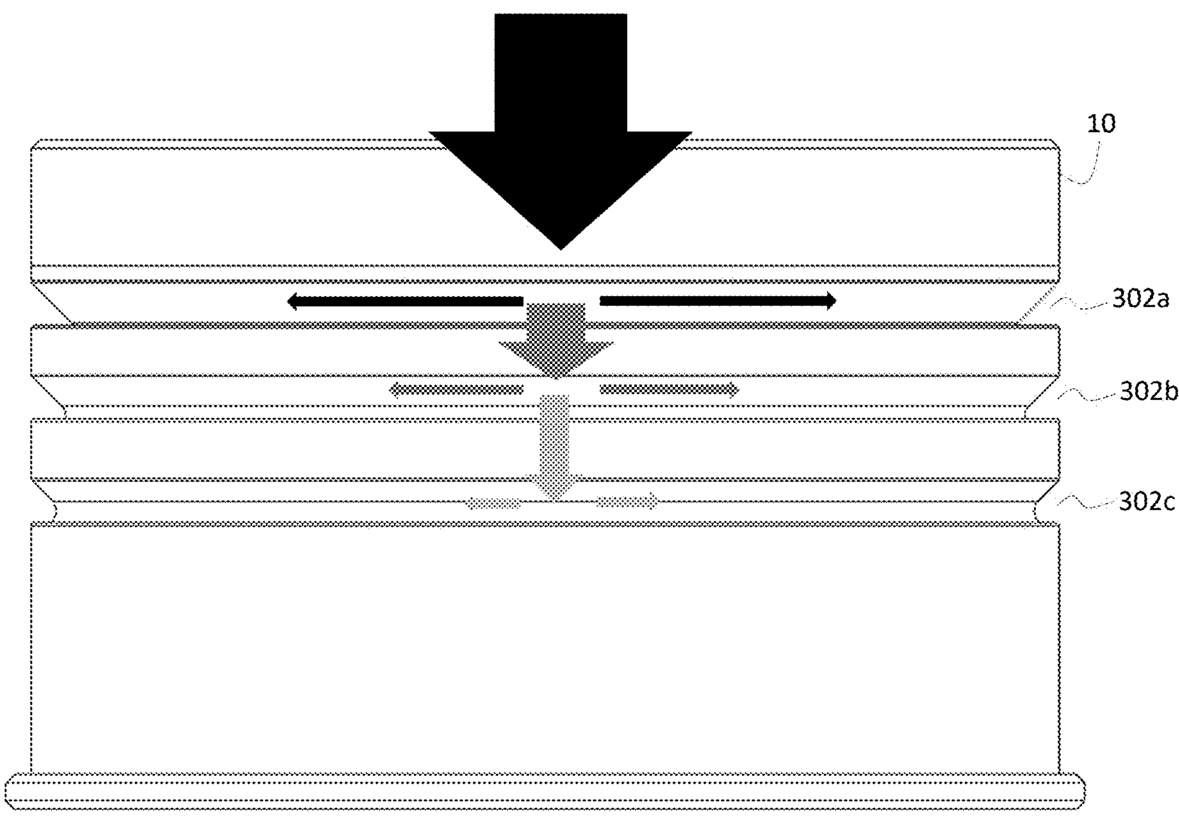
FIG. 8 is an illustration of radial flow of gas in the grooves of the labyrinth seal, according to an embodiment.

FIG. 8 is an illustration of radial flow of gas in the grooves of the labyrinth seal, according to an embodiment. Generally, leaks tend to start as localized events which can overwhelm the primary seal 50 in the local region which leads to larger leaks. The labyrinth seal 30 allows for mitigation of local conditions by allowing the gas entering the grooves 302*a,c* to expand annularly around the the groove 302 thereby reducing the local pressure gradiant of the leak at the point of entrance.

As leakage is almost exclusively a non-uniform event that occurs over a small portion of the full circumference, the arrayed sequence of grooves serves to incrementally reduce the total mass of the leaking gas, allowing it to expand not only radially, but also circumferentially within the grooves to rapidly reduce the pressure of the leaking flow. This incremental approach is capable of fully arresting the errant gasses, and may be expanded to accommodate various mass flow rates and pressures of leaking gasses.

While the invention has been described with reference to certain embodiments, numerous changes, alterations and modifications to the described embodiments are possible without departing from the spirit and scope of the invention as defined in the appended claims, and equivalents thereof.

What is claimed is:

1. An Armament system comprising a gun barrel comprising a static interior surface for receiving and having removed an ammunition cartridge case which forms a slip-fit with the static interior surface of the gun barrel; and an ammunition cartridge comprising a non-rotating slip-fit stub base configured for providing a primary seal against the static interior surface of the gun barrel by expansion of the stub base against the static interior surface, the stub base comprising a cylindrical cup-shaped body having an open end and a closed end defining an interior cavity, a flange positioned at the closed-end of the body and wherein the body is configured to expand outward against the static surface in response to a pressure increase in the interior cavity; and a secondary labyrinth seal defined by an exterior circumferential surface of the stub base, said labyrinth seal further comprising one or more grooves defined by the exterior circumferential surface of the body and extending radially around the exterior circumference of the body and wherein each of the one or more grooves extends into the body at an angle toward the closed end of the non-rotating slip fit seal and does not extend past the exterior circumferential surface such that said exterior circumferential surface maintains a flush face with respect to the interior surface of the gun barrel and the one more grooves do not interact with the interior surface of the gun barrel and wherein each of the one or more grooves has a cross-sectional profile to induce backflow of a gas within the groove.

2. The armament system of claim 1 wherein each of the one or more grooves extends into the body with a uniform width.

3. The armament system of claim 1 wherein the labyrinth seal comprises a plurality of grooves and each of the plurality of grooves comprises the same angle with respect to the exterior surface of the body.

4. The armament system 1 wherein the labyrinth seal comprises a plurality of grooves spaced axially along the exterior surface of the body and which decrease in depth from the open end of the body to the closed end of the body.

5. An ammunition cartridge comprising non-rotating slip-fit stub base configured for providing a primary seal against a static interior surface of a gun barrel by expansion of the stub base against the static interior surface of the gun barrel, the stub base comprising a cylindrical cup-shaped body having an open end and a closed end defining an interior cavity, a flange positioned at the closed-end of the body and wherein the body is configured to expand outward against the static interior surface of the gun barrel in response to initiation of a propellant; and a secondary labyrinth seal defined by an exterior circumferential surface of the stub base body, said labyrinth seal further comprising three grooves defined by the exterior circumferential surface of the stub base body, extending radially around the exterior circumference of the stub base body and spaced axially along the exterior circumferential surface, each of the said three grooves extends into the body at a uniform angle toward the closed-end at a uniform width and that each of the one or more lands between the grooves do not extend past the exterior circumferential surface such that said exterior circumferential surface maintains a flush face with respect to the static interior surface of the gun barrel and the one more grooves do not interact with the static interior surface of the gun barrel and wherein each of the one or more grooves and wherein the three grooves decrease in depth from the open end of the body to the closed end of the body and has a cross-sectional profile to induce backflow of a gas within the groove.

* * * * *